(12) United States Patent
Hendriksen et al.

(10) Patent No.: US 9,269,963 B2
(45) Date of Patent: Feb. 23, 2016

(54) SOLID OXIDE CELL STACK AND METHOD FOR PREPARING SAME

(75) Inventors: Peter Vang Hendriksen, Hillerød (DK); Lars Mikkelsen, Rødovre (DK); Martin Søgaard, Ringe (DK); Jens Valdemar Thorvald Høgh, Copenhagen K (DK); Wolff-Ragnar Kiebach, Copenhagen N (DK); Kresten J. N. L. Jensen, Hillerød (DK)

(73) Assignees: Technical University of Denmark, Lyngby (DK); Haldor Topsoe A/S, Lyngby (DK)

( * ) Notice: Subject to any disclaimer, the term of this patent is extended or adjusted under 35 U.S.C. 154(b) by 259 days.

(21) Appl. No.: 13/884,571

(22) PCT Filed: Nov. 11, 2010

(86) PCT No.: PCT/EP2010/006859
§ 371 (c)(1),
(2), (4) Date: May 9, 2013

(87) PCT Pub. No.: WO2012/062341
PCT Pub. Date: May 18, 2012

(65) Prior Publication Data
US 2013/0224620 A1   Aug. 29, 2013

(51) Int. Cl.
*H01M 4/88* (2006.01)
*H01M 4/90* (2006.01)
*H01M 8/24* (2006.01)
*C25B 9/00* (2006.01)
*H01M 8/12* (2006.01)

(52) U.S. Cl.
CPC ............... *H01M 4/8846* (2013.01); *C25B 9/00* (2013.01); *H01M 4/9016* (2013.01); *H01M 8/2425* (2013.01); *H01M 2008/1293* (2013.01); *Y02E 60/50* (2013.01); *Y02E 60/525* (2013.01)

(58) Field of Classification Search
CPC ............ H01M 4/8846; H01M 4/9016; H01M 8/2425; H01M 2008/1293; Y02E 60/50; Y02E 60/525
See application file for complete search history.

(56) References Cited

U.S. PATENT DOCUMENTS 5,937,264 A  *  8/1999  Wallin ............................. 419/2
2010/0143762 A1   6/2010  Mukerjee et al.

FOREIGN PATENT DOCUMENTS

DE        198 17 510 A1    11/1998
EP        2 031 675 A1     3/2009
WO     WO 2007/025762 A2   3/2007

* cited by examiner

*Primary Examiner* — Raymond Alejandro
(74) *Attorney, Agent, or Firm* — Dickstein Shapiro LLP

(57) ABSTRACT

A method for producing and reactivating a solid oxide cell stack structure by providing a catalyst precursor in at least one of the electrode layers by impregnation and subsequent drying after the stack has been assembled and initiated. The method includes impregnating a catalyst precursor into a cathode of a solid oxide cell stack which already contains an active material (an anode reduction) for example, in the form of Ni/YSZ anodes. Due to a significantly improved performance and an unexpected voltage improvement this solid oxide cell stack structure is particularly suitable for use in solid oxide fuel cell (SOFC) and solid oxide electrolysing cell (SOEC) applications.

15 Claims, 4 Drawing Sheets

SOLID OXIDE CELL STACK AND METHOD FOR PREPARING SAME

BACKGROUND OF THE INVENTION

1. Field of the Invention

The present invention relates to a solid oxide cell stack structure and a method for preparing same. In particular the invention relates to a method for producing a novel solid oxide cell stack structure by providing a catalyst precursor in the electrode layers after the stack has been assembled and initiated. The invention relates also to a method for reactivation of a solid oxide cell stack structure that has degraded during operation. The solid oxide cell stack structure is particularly suitable for use in solid oxide fuel cell (SOFC) and solid oxide electrolysing cell (SOEC) applications.

2. Description of the Related Art

Solid oxide cell (SOC) is the generic term for specific types of electrochemical cells, particularly solid oxide fuel cells (SOFC) and solid oxide electrolysing cells (SOEC) which in either case contain a solid electrolyte layer arranged in between two electrodes. One electrode acts as cathode and the other as anode. Usually, a solid oxide cell stack structure is formed by assembling a plurality of single cells into a stack and by providing internal and/or external manifolds. The manifolds enable the proper distribution of the reaction fluid into each single cell. The reaction fluid usually takes the form of an oxidant gas, such as air, and a suitable fuel, such as hydrogen. In SOFC the oxidant is in contact with the cathode while a fuel oxidised in the process is in contact with the anode. Conversely, in SOEC a fuel (like hydrogen or CO) is produced at the cathode by a reduction process from supplied species like steam or $CO_2$, and oxygen is produced at the anode.

During preparation of SOC stack structures, single planar cells are stacked together with other components such as interconnect layers, current collectors and seals. Gas manifolds are subsequently adapted to the stack. After the stack has been assembled and provided with manifolds, the stack is subjected to a conditioning step, in which the stack is sintered by heat treating at temperatures usually above 800° C. and under pressure in order to tighten the seals and achieve electrical contact between the components of the stack.

A crucial part of the preparation of the final solid oxide cell stack structure is the provision of catalytic activity in the electrodes of the single cells forming the stack. Usually stacks are assembled by using electrodes where the catalytic material is an inherent part of the electrodes, for instance Ni/YSZ anodes and LSM/YSZ cathodes. Thus the electrodes are already active upon stacking and assembly.

Alternatively, the catalytic activity in electrodes can be provided in the stack manufacturing process itself rather than using already active electrodes. This can be done by impregnation of the individual electrodes with a suitable catalyst such as doped ceria prior to the sintering of the components of the cell and accordingly prior to the assembling of the cells into a stack.

This is for instance disclosed in EP-A-2031675 where the electrode (anode structure) is impregnated with a precursor solution of ceria which contains a solvent and a surfactant. After impregnation, one or more calcination steps in air is/are conducted at above 200° C. in order to form the desired oxides of ceria. Thereby nano-sized particles of ceria are provided in the electrode. Where an electrolyte is adapted to the electrode prior to the impregnation above, one or more sintering steps in a reducing atmosphere at above 1000° C. is also conducted.

In other instances, such as described in WO-A-2007/025762, the electrodes are impregnated after sintering the stack. Alternatively, the impregnation of the electrodes with a suitable catalyst is conducted after the sintering of the components, yet prior to the assembling of the components into a stack, thereby suppressing the negative effect on the performance exerted by unwanted reactions between the catalyst and the electrode material or unwanted reactions between the catalyst and the electrolyte material.

In either situation, an improvement in the anode and cathode performance is observed at these stages of impregnation at the production site itself, where impregnation is typically done on the cell as prepared, i.e. after the cathode firing step, so that the electrode becomes receptive to the impregnation. It is usually assumed that the electrode is most receptive for impregnation at this stage of production However, it has been found that the beneficial effect of the catalyst in the electrodes is partly or fully lost upon heating the cells above 800° C. during stack assembling and initiation. Moreover, when subsequently put into operation, the catalytic activity in the electrodes of the stack structure is reduced over time due to for instance nickel agglomeration or sintering in the anodes or cathode degradation because of instability towards decomposition and impurities. This results in an overall decrease in the performance of the solid oxide cell stack structure. Such loss of performance can bring the stack structure outside the required specifications within a given application, for instance in SOFC stack structures used in power producing units, thus forcing their replacement. This is cost-intensive and deterring when considering the commercial prospects of using solid oxide cell technology.

SUMMARY OF THE INVENTION

We have now found that it is possible to significantly improve the performance of the solid oxide cell structure having electrodes that are already catalytically active by impregnating the electrodes with a catalyst after the stack has been assembled and initiated, for instance just after the stack has been assembled in the laboratory or at the production site, or later on in the lifetime of the stack, particularly after the stack has been initiated in the operation or application site. Hence, we impregnate a stack that is already active and ready for operation with precursors of a catalytic material and yet find that the stack performance is actually improved.

The invention therefore concerns a method for producing and reactivating a solid oxide cell stack structure by providing a catalyst precursor in the electrode layers after the stack has been assembled and initiated.

DETAILED DESCRIPTION OF THE INVENTION

Figure 1:
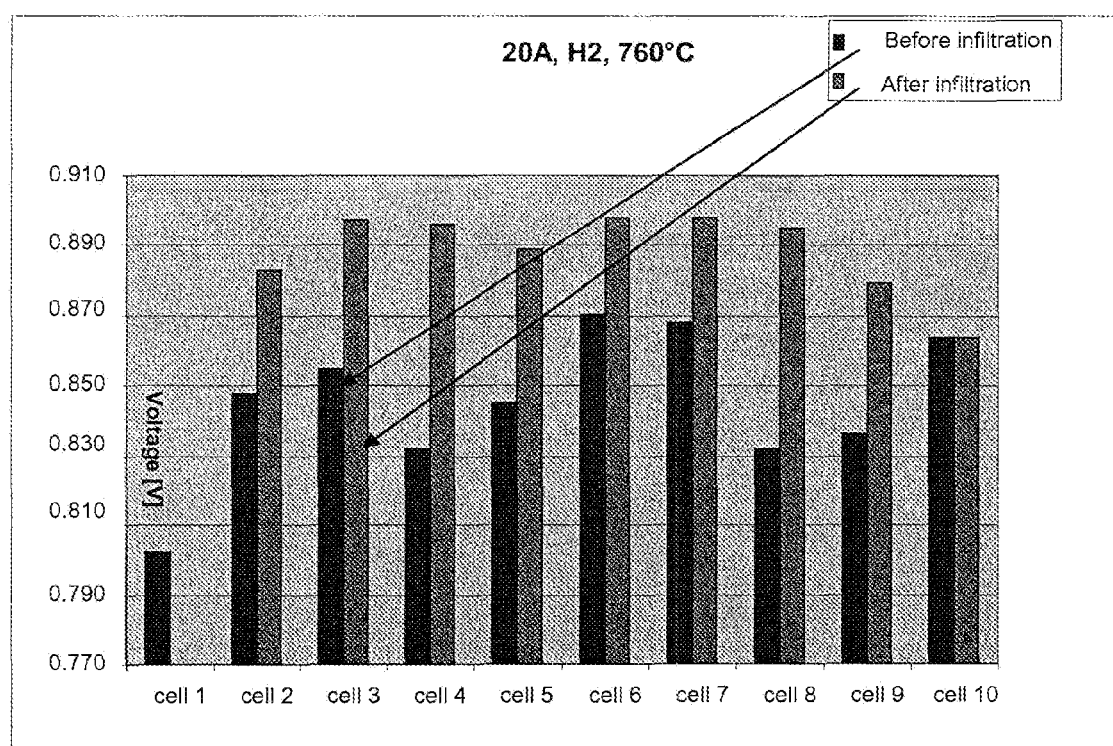
FIG. 1 shows the observed unexpected voltage improvement of all ten cells in a cell stack.

In a first aspect of the invention we provide a method for producing a solid oxide cell stack structure and the novel solid oxide cell stack structure as such produced by the method. Accordingly, we provide a method for producing a solid oxide cell stack structure, where said structure comprises an internal manifold, an external manifold or a combination of both, where said structure has been assembled by arranging a plurality of single solid oxide cells into a stack, each single solid oxide cell containing electrode layers separated by an electrolyte layer, and where said structure has been initiated, the method comprising the steps of:

(a) impregnating a catalyst precursor in at least one of the already active electrode layers of the solid oxide cell stack by introducing a solution of the catalyst precursor via the internal or external manifold, and (b) subsequently drying the solution of the catalyst precursor, wherein steps (a) and (b) are conducted at least once after the stack has been assembled and initiated.

The term "initiated" means anode reduction and refers specifically to a process step (initiation) after stack assembling where the SOC stack is pre-conditioned by applying a reducing gas to the anode at temperatures above 700° C., usually above 800° C.

The initiation may take place in the laboratory or at the SOC production site as well. It may also take place at the operation or application site, for instance in a module comprising the SOC cell stack structures. Thus, the invention makes it possible for such SOC stack structures to be produced in situ, i.e. during operation in a given application, where initiation is conducted as part of the operation of the module comprising the SOC stack structures.

In connection with the above general embodiment of the invention and one or more embodiments described below, at least one of the electrode layers in step (a) is an already active electrode.

By the term "already active electrode" is meant electrodes which inherently possess catalytic activity, for instance nickel in Ni/YSZ anodes.

It is also to be understood that prior to initiation the anode contains nickel in the form of nickel oxide apart from cerium and gadolinium. The initiation step reduces the NiO into the catalytically active element Ni.

In connection with the above embodiments of the invention and one or more embodiments described below, catalytically active material is provided in at least one of the electrode layers of the single solid oxide cell via a conventional ceramic processing technique or by an impregnation with a catalyst precursor before the stack is initiated. Hence, the electrodes may also be provided with catalytic material after the stack has been assembled, but before initiation or even earlier in the process, i.e. before the stack has been assembled. According to this embodiment the electrodes may either be already active electrodes and thus possess inherent catalytic activity, or the electrodes have no inherent catalytic activity and therefore their catalytic activity must be provided during the process before or after assembling the stack.

The provision of the catalyst after the assembling and the initiation can also be conducted immediately after the initiation. Even though the electrodes may have been provided with catalyst before the assembling and the initiation as known in the art, a further impregnation immediately after the initiation serves unexpectedly as a top-up impregnation in order to fill up more of the available porosities in the electrodes.

Hence, in connection with the above embodiments of the invention and one or more embodiments described below, the invention also comprises conducting steps (a) and (b) within max. 10 hrs after the stack has been initiated, preferably within 1 hr after the stack has been initiated. That is, in practice, immediately after the stack has been initiated. We make this definition of time scale because it may also be desirable to conduct steps (a) and (b) much later in the life-time of the stack structure. Accordingly, the invention also encompasses conducting steps (a) and (b) after the stack has been in operation for 1000 hrs or more, for instance 10,000 hrs or more. Therefore, the invention also comprises repeating steps (a) and (b) over the life-time of the solid oxide cell stack structure, i.e. steps (a) and (b) are conducted at least twice over the lifetime of the solid oxide cell stack structure. Since the catalyst particles are likely to lose activity over time due to coarsening, particle sintering or surface inactivation due to accumulation of impurities or reaction with adjacent particles, this embodiment enables in a simple manner the reactivation of the solid oxide cell stack structure. Hence, instead of replacing the SOC stack structure when the performance gets below a certain level, the full stack is reactivated by impregnating the electrodes again in what can be regarded as a "flush-to-fix" step. The method renders superfluous the replacement of stacks in power producing units that have degraded outside the required performance specifications.

The impregnation of the catalyst and the subsequent drying after initiation make it possible for more catalytic material to be impregnated in the electrodes. For the SOFC anode the major part of the required anode porosity is actually formed during the initiation, i.e. the anode reduction step that takes place after stack assembly, whereas it is more difficult to impregnate the anode in the cell as prepared (after the cathode firing step, yet prior to initiation) because the porosity at this stage is lower. It has turned out that heat treating the single cells to above 800° C. during stack assembly impairs the cathode and anode performance of electrodes where the catalyst has been added by an impregnation route during cell manufacture. Hence, contrary to known techniques, where the electrodes were most receptive to impregnation in the cells before stack assembling or even after stack assembling, yet before initiation, we have found that the electrode performance and thereby the performance of SOC stack structures are improved by impregnating the catalyst precursor in the electrode structures after stack assembly and initiation.

Another advantage of the present invention is that the amount of catalyst deposited in the electrodes and the overall catalyst dispersion in the electrodes both are less sensitive to the impregnation procedure. Hence, in connection with one or more of the above and below embodiments the invention also encompasses impregnating the catalyst precursor by means of pouring or pumping a solution of the catalyst precursor through the manifolds of the stack. This pouring or pumping involves flushing the solution, preferably an aqueous solution, through the manifolds of the stack and represents a simple, straightforward, elegant and rather inexpensive way of providing the catalyst to the electrodes compared to other suitable, yet much more complicated impregnation methods such as pressure filtration. More preferably the impregnation is conducted by pumping the solution of catalyst through pipes adapted to any of the manifolds of the solid oxide cell stack structure. This represents an even easier and more simple procedure than pouring. The material chosen for impregnation, such as a salt of the catalytically active component, is preferably dissolved in aqueous solution and the solution is sent via the internal or external manifold through the stack on the cathode or anode side (or both), depending on which side of the cells is to be impregnated. Organic solutions, suspensions of particles, melts and aerosols can also be used. The cells become wet on one or both sides and the salt is deposited by drying, thus leaving small particles with a high catalytic effect on the electrode. The form and composition of the particles may change during the subsequent heating to the temperature of operation due to decomposition of the precursors and formation of more stable oxide particles. The process of achieving a good dispersion of the suspension or precursor solution in the electrode structure is assisted by placing the stack in vacuum prior to drying and optionally by adding suitable surfactants to the solution. Accordingly, in connection with one or more of the above and below embodiments, the invention also encompasses providing a vacuum to the stack prior to the drying step. The vacuum is provided in the stack by e.g. connecting a vacuum pump to the manifold volume or by placing the stack in a vacuum chamber, preferably for up to 12 hrs prior to the drying step.

The stack can now be operated as usual, but with a reduced area specific resistance (ASR) and thereby an improved performance due to the deposited particles.

It is to be understood that the term "drying" as used herein defines removal of water or any other solvent utilised in the solution of the catalyst precursor.

Yet another advantage is that the catalyst can be deposited properly by simple drying procedures. Hence, in connection with one or more of the above and below embodiments the invention encompasses drying the solution of the catalytic precursor by blowing air through the stack or heating the stack at 100° C. or higher (calcination). For instance, air at 100° C. or 200° C. can be blown through the stack or the stack may simply be put in a furnace at 100° C. or 200° C. or higher. The desired oxide of the catalytic precursor material is formed during the drying step or in the subsequent heating of the stack to the operating temperature.

The catalyst precursor is preferably selected from the group consisting of Ni, Ni—Fe alloy, ceria, doped ceria, zirconia, doped zirconia, $Ma_sTi_{1-x}Mb_xO_{3-\delta}$ with Ma=Ba, Sr, Ca; Mb=V, Nb, Ta, Mo, W, Th, U; $0 \leq s \leq 0.5$; $LnCr_{1-x}M_xO_{3-\delta}$, where Ln is an element of the lanthanide series and M=Ti, V, Mn, Nb, Mo, W, Th, U, $Pr_2O_3$ and $AEZr_{1-x-y-z}Ce_xY_yYb_zO_3$, where AE=Ba, Sr, Ca; and mixtures thereof. These materials are suitable where the electrode for impregnation is the SOFC anode.

Where the electrode for impregnation is the SOFC cathode, the catalyst precursor is preferably selected from the group consisting of LSM $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y, Ca)Fe_{1-y}Co_yO_{3-\delta}$, ceria, doped ceria, zirconia, doped zirconia, La(Ni,Fe)$O_3$, La(Ni,Co)$O_3$, $La_2NiO_4$, $Ln_{1-x}AE_{2x}TmO_4$, where TM is a transition metal, Ln is a lanthanide element, and AE is an alkali earth element, $Pr_2O_3$; and mixtures thereof. $\delta$ is a number for the oxygen deficiency in the lattice and is dependent on composition and the actual oxygen partial pressure $pO_2$ (as $pO_2$ decreasomg, $\delta$ increases). The number is usually between 0 and 0.3.

Impregnations designed to improve the performance via an improved tolerance to impurities such as $SiO_2$ or "poisonous" species carried with the gas are another desired option. Precursors for this purpose are MgO, CaO, $Al_2O_3$/MgO, $CaZrO_3$, $SrZrO_3$, $BaZrO_3$, CaO, SrO, BaO or the carbonates $SrCO_3$, $CaCO_3$, $BaCO_3$.

More preferably, the catalyst precursor is provided as an aqueous solution of ceria. This is the most inexpensive and simplest way of providing the catalyst.

In order to promote the formation of nanosized catalyst particles in the electrodes, the solution, preferably the aqueous solution contains a solvent and a surfactant. After impregnation and heating (calcination) of the at least one electrode, nanosized ceria particles are formed upon removal of the surfactant of the solution. The nanosized particles disperse throughout the porosities of the electrode and result in an improved performance of the electrode, as the area specific resistance is reduced. Nanosized particles as used herein define particles having average particle diameter of 1 to 100 nm, preferably 1 to 50 nm, more preferably 5 to 40 nm, such as 5 to 20 nm.

We have also found that the best performance in terms of lower ASR or voltage improvement in the cells of the stack is obtained where the electrode in step (a) is the cathode. Accordingly, in connection with the above embodiments and one or more of the embodiments below, in step (a) the at least one of the electrode layers is preferably a cathode.

As a result of the impregnation and drying after the stack has been assembled and initiated, a novel solid oxide cell structure is obtained having better performance, i.e. a lower area specific resistance (ASR) and/or a higher power density or higher voltage than solid oxide cell structures in which impregnation of the electrodes is simply conducted before initiation, such as before stack assembling or even after stack assembling, yet prior to initiation, or where the electrodes are already activated. Accordingly, the invention encompasses also the product as such as defined in claim 15 in the form of a solid oxide cell stack structure made by the method of claims 1 to 14 as well as the use of the solid oxide cell stack structure as solid oxide fuel cell stack (SOFC) or solid oxide electrolysis cell stack (SOEC), as defined in claims 16 and 17, respectively.

The invention not only provides the production of novel SOC stack structures. It provides also a method for the restoration of activity (reactivation) of existing solid oxide cell structures whose electrodes already possessed catalytic activity, such as the above mentioned already active Ni/YSZ anodes or LSM/YSZ cathodes, as well as solid oxide cell structures whose electrodes have been impregnated with a catalyst according to known techniques before stack assembling and initiation.

We have found that stacks that have inferior electrical performance due to degradation over use for many thousands of hrs can be reactivated to the initial performance by adding further catalytic material to the electrodes through impregnation with catalyst precursors in the used stacks.

Hence, according to a second aspect of the invention and as defined in claim 18 we also provide a method for reactivating a solid oxide cell stack structure, in which said structure comprises an internal manifold, external manifold or a combination of both, and in which said structure has been assembled by arranging a plurality of single solid oxide cells into a stack, each single solid oxide cell containing electrode layers separated by an electrolyte layer, the method comprising the steps of: (a) impregnating a catalyst precursor in at least one of the electrode layers of the solid oxide cell stack by introducing a solution of the catalyst precursor via the internal or external manifold, and (b) subsequently drying the solution of the catalyst precursor, wherein steps (a) and (b) are conducted after the stack has been assembled and initiated.

As used herein the term "reactivating" means restoring the performance of the SOC cell stack structure in terms of ASR and/or power density to a level equal to or at most 10% lower than the SOC cell stack structure after initiation.

In connection with the above general embodiment defined in claim 18 and one or more of the embodiments described below, at least one of the electrode layers in step (a) is an already active electrode. Preferably the catalytically active material is provided in at least one of the electrode layers of the single solid oxide cell via a conventional ceramic processing technique or by an impregnation with a catalyst precursor before the stack has been initiated. This renders it possible, once again, to extend the lifetime of the SOC stack structure, this time on conventional SOC stack structures produced by providing the catalyst on the electrodes before the stack has been assembled and initiated, such as in WO-A-2007/025762, by realizing the impregnation step (a) and drying step (b) at the operation site or customer site.

The impregnation treatment can be conducted by impregnating the catalyst precursor and subsequently subjecting it to a drying at least once after the stack has been in operation for 1000 hrs or more, for instance after 10,000 hrs or more, such as 20,000 hrs. An expensive replacement of SOC cell stack structures is thereby avoided.

In connection with the embodiment defined in claim 18 and one or more of the below embodiments, the impregnation in step (a) is, as already described above, preferably conducted by way of pouring or pumping a solution of catalyst precursor through the manifolds of the stack. More preferably the impregnation is conducted by pumping the solution of catalyst through pipes adapted to any of the manifolds of the solid oxide cell stack structure. This represents an even easier and simpler procedure than the pouring.

The drying in step (b) is preferably conducted by blowing air through the stack or heating the stack at 200° C. or higher.

The selection of a catalyst for use when reactivating the SOC cell stack structure is also the same as described above. The catalyst precursor is preferably selected from the group consisting of Ni, Ni—Fe alloy, ceria, doped ceria, zirconia, doped zirconia, $Ma_sTi_{1-x}Mb_xO_{3-\delta}$ with Ma=Ba, Sr, Ca; Mb=V, Nb, Ta, Mo, W, Th, U; $0 \leq s \leq 0.5$; $LnCr_{1-x}M_xO_{3-\delta}$, where Ln is an element of the lanthanide series, and M=Ti, V, Mn, Nb, Mo, W, Th, U, $Pr_2O_3$ or $AEZr_{1-x-y-z}Ce_xY_yYb_zO_3$, where AE=Ba, Sr, Ca; and mixtures thereof. These materials are suitable where the electrode for impregnation is the SOFC anode.

Where the electrode for impregnation is the SOFC cathode, the catalyst precursor is preferably selected from the group consisting of LSM $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3-\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y, Ca)Fe_{1-y}Co_yO_{3-\delta}$, ceria, doped ceria, zirconia, doped zirconia, $La(Ni,Fe)O_3$, $La(Ni,Co)O_3$, $La_2NiO_4$, $Ln_{1-x}AE_{2x}TmO_4$, where TM is a transition metal, Ln is a lanthanide element and AE is an alkali earth element, $Pr_2O_3$; and mixtures thereof. $\delta$ is a number for the oxygen deficiency in the lattice and is dependent on the composition and the actual oxygen partial pressure $pO_2$ (as $pO_2$ decreases, $\delta$ increases). The number is usually between 0 and 0.3.

Also as described above, the catalyst precursor is preferably provided in form of an aqueous solution of ceria. More preferably, the aqueous solution contains a solvent and a surfactant.

The treatment may be done once, but repeated treatments with an intermediate drying are preferred. The precursor solution may vary between the treatments. Of special preference is a treatment with ceria in the first step and a Pr-nitrate in a subsequent step.

The invention is suitable for the production of novel SOC stack structures with an improved performance and durability (viz. an improved resistance to degradation when operated at high temperatures, e.g. above 700° C.) as well as for the reactivation of the performance of existing SOC stack structures, regardless of whether they are anode or metal supported.

Whereas the primary function of the treatments is an improvement of the electrical performance, the treatment also has other beneficial effects. We have found that the repeated impregnation/drying treatments also serve to improve the sealing of the anode and gas compartments. Effectively the open circuit voltage of stacks is improved after the treatments (see Example 1 below).

It is to be understood that the invention is not limited to a treatment resulting merely in the enhancement of the surface area of the catalyst in the electrode structures. The treatment with nanoparticles dispersed in a stack after initiation or after a long term operation may improve the electrical performance via a range of different mechanisms like: (a) providing active sites for scavenging detrimental phases which are otherwise blocking the active sites for the electrode reaction, (b) providing new sites for the electrode reactions compensating for sites that may have been blocked by impurities originating from the cell materials or brought to the electrode via the gas streams, such as Cr or S species or other, (c) providing new sites for the electrode reaction to compensate for activity lost by particle coarsening and providing a sintering inhibitor counteracting further particle coarsening, and (d) providing addition of specific elements to compensate for loss of these specific elements in the desired places occurring during operation.

The invention is further illustrated by the following examples.

EXAMPLE 1

This example shows the performance in terms of voltage improvement of a solid oxide fuel cell structure at 760° C. The structure contains ten single cells and is prepared according to the invention where the cathode of the single solid oxide cells has been impregnated with a catalyst precursor after the stack has been assembled and initiated. The electrode layers of the single solid oxide cells have not been impregnated with a catalyst precursor before the stack is assembled and initiated, but contain the active material already in form of an Ni/YSZ anode and an LSM/YSZ cathode. In other words, the electrodes are already active.

After the assembling and the initiation (anode reduction), the cathode is impregnated with catalytic material (79% $CeO_2$, 21% $GdO_{11/2}$).

Appropriate amounts of the nitrate salts (here Ce-nitrate and Gd-nitrate) are dissolved in deionized water. A suitable surfactant (e.g. P123) is added with stirring. For the specific case the concentration was 1.5 M (molar concentration). The solution was flushed through the manifold compartments of the stack. The manifold volume is connected to a container holding the solution. A vacuum pump is connected to the other gas access point of the specific compartment, and the solution is flushed through the compartment at a rate of 30 ml/min thereby establishing a negative pressure via the vacuum pump. Subsequently the stack was placed in a vacuum chamber and the pressure was reduced to 100 mbar, where it was maintained until no further solvent evaporation was detected. Finally the stack was heated to 350° C. at a rate of 100 K/h and subsequently cooled.

The performance was measured in terms of voltage improvement of the cells of the stack operated at 0.22 A/cm² and 760° C.

FIG. 1 shows the voltage improvement of all ten cells in the stack. It is observed that with the cathode impregnation and at 20 A, the voltage unexpectedly increases about 40 mV on average (difference between lower and higher bars) except for the end cells 1 and 10.

Figure 4:
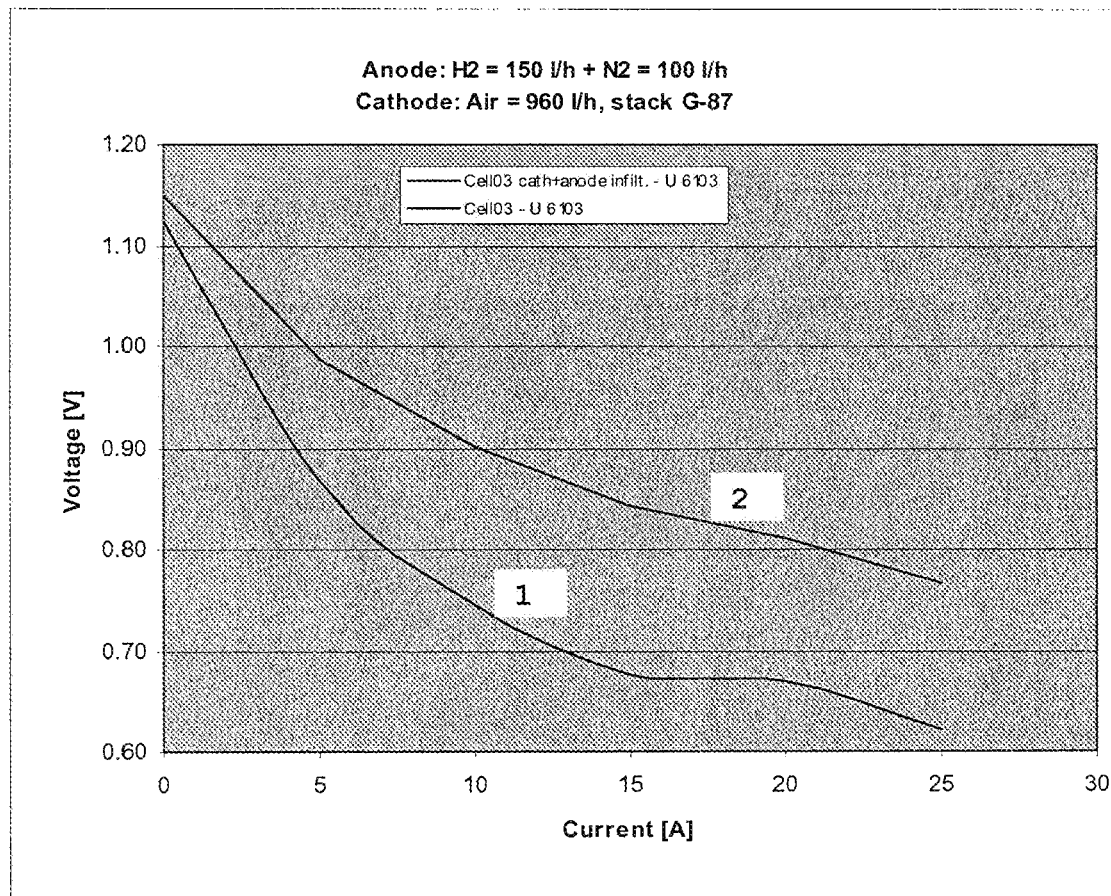
FIG. 4 illustrates the increase observed in the Open Circuit Voltage (OCV) of the stack after impregnation. The increase in OCV is documented under identical test conditions before (1) and after (2) impregnation.

The outlined treatment was further beneficial for the gas tightness of the stack as illustrated by an increase in measured Open Circuit Voltage (OCV) of the stack after the impregnation. This is illustrated in FIG. 4, where a 20 mV increase of the OCV is documented after impregnation (line 2) under identical test conditions before (1) and after (2) impregnation.

EXAMPLE 2

This example shows the performance in terms of voltage improvement of a solid oxide fuel cell structure at 680° C. The structure contains 10 single cells and is prepared according to the invention where the cathode of the single solid oxide cells has been impregnated with a catalyst precursor after the stack has been assembled and initiated. The electrode layers of the single solid oxide cells have not been impregnated with a catalyst precursor before the stack is assembled and initiated, but contain the active material already in form of an Ni/YSZ anode and an LSM/YSZ cathode. In other words, the electrodes are already active.

After the assembling and the initiation (anode reduction), the cathode is impregnated with catalytic material (79% $CeO_2$, 21% $GdO_{11/2}$).

Figure 2:
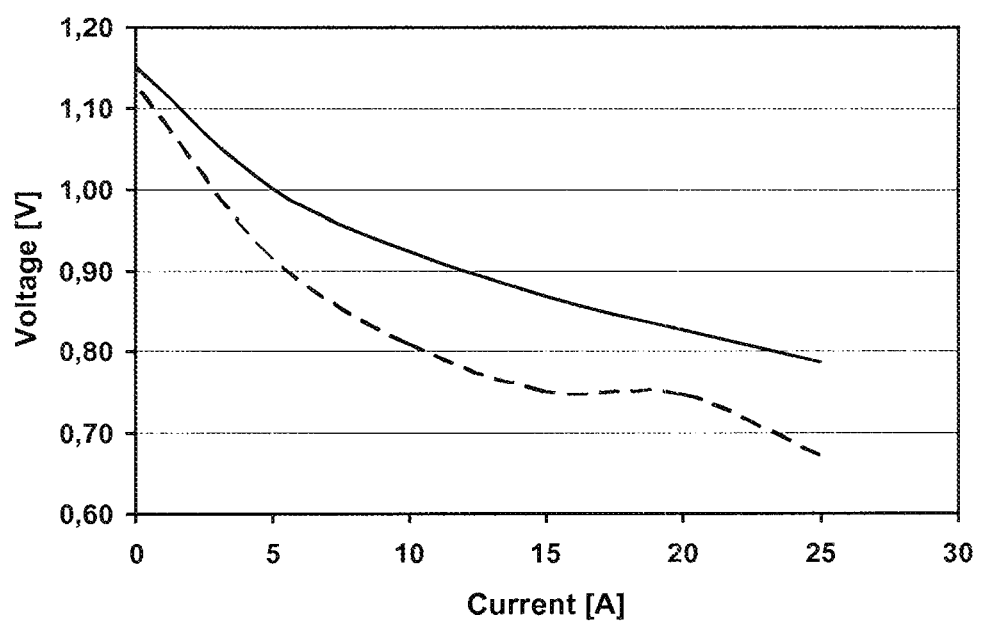
FIG. 2 shows the voltage improvement of a single cell of the stack comprising ten single cells.

The performance was measured in terms of voltage improvement of the cells of the stack at 0.22 A/cm$^2$ and 680° C. In the anode: $H_2$=150 l/h+$N_2$=100 l/h and in the cathode air=960 l/h. FIG. 2 shows the voltage improvement of the single cell number 8 of the stack comprising ten single cells. It is observed that with the cathode impregnation and at 20 A, the voltage now increases about 100 mV, from 0.75 V in the lower curve to 0.85 V in the upper curve. Similar voltage increases are observed for the other cells of the stack. On average the voltage increases about 100 mV across all cells.

EXAMPLE 3

Figure 3:
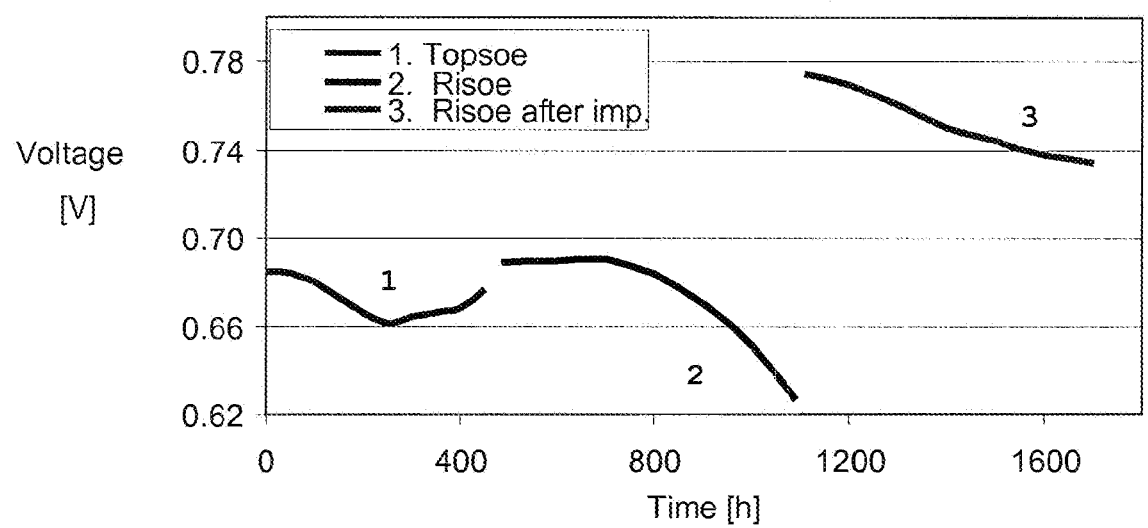
FIG. 3 shows the history of the stack, illustrated by plotting the measured voltage under a given current load.

A 10 cell 12×12 cm stack based on anode supported cells with Ni/YSZ anodes and LSM/YSZ cathodes was assembled according to usual procedures. Some of the cells had been impregnated with a CGO precursors prior to the stack assembling right after the cathode firing. The electrical performance of these cells was indistinguishable from the electrical performance of those cells not impregnated. The stack was operated at ~700° C. under a current load of 25 A while feeding 150 l/h $H_2$ to the anode compartment. After about 400 hrs of operation, the stack operation was terminated and the stack cooled. After ~30 days of storage under ambient conditions the stack was brought into operation again, but this time at a new site in a different laboratory. The initial performance was close to the one observed during the first test period, but after ~100 hrs of operation the electrical performance of several cells started to degrade. After 1100 hrs of operation the stack was cooled down, and the electrodes were impregnated with a ceria precursor as described in Example 1. A distinct improvement of the electrical performance was observed when the stack was reactivated after the infiltration bringing the electrical performance even higher up than the recoded initial performance. This is shown in FIG. 3, where the history of the stack is illustrated by plotting the measured voltage under a current load of 25 A in the three different test stages outlined above (viz. test in first laboratory (1); test in second laboratory (2); test after impregnation (3)).

This example shows that:
the impregnation prior to the stack assembling is not as efficient as when the process is done after the stack assembling (here after 1100 hrs of operation), and
the outlined treatment may be used to re-establish the electrical performance of a degraded stack after thousand hrs of test (at a site different from the production site).

The invention claimed is:

1. A method for producing a solid oxide cell stack comprising an internal manifold, an external manifold or a combination of both, the method comprising the steps of:
assembling the solid oxide cell stack by arranging a plurality of single solid oxide cells into a stack, each of the plurality of single solid oxide cells containing electrode layers separated by an electrolyte layer;
initiating the solid oxide cell stack by undergoing anode reduction; and the method further comprising the steps of:
(a) impregnating a catalyst precursor into only a cathode of the solid oxide cell stack by introducing a solution of the catalyst precursor via the internal or external manifold, and
(b) subsequently drying the solution of the catalyst precursor,
wherein steps (a) and (b) are conducted at least once after the solid oxide cell stack has been assembled and initiated so that the electrode layers become catalytically active.

2. Method according to claim 1, wherein the cathode in step (a) is already active.

3. Method according to claim 1, in which catalytic active material is provided in at least one of the electrode layers of each of the plurality of single solid oxide cells via a ceramic processing technique or by an impregnation with the catalyst precursor before the solid oxide cell stack has been initiated.

4. Method according to claim 1, comprising impregnating the catalyst precursor by means of pouring or pumping the solution of the catalyst precursor through the manifolds of the stack.

5. Method according to claim 1, comprising providing a vacuum to the solid oxide cell stack prior to the step of subsequently drying the solution of the catalyst precursor.

6. Method according to claim 1, comprising drying the solution of the catalyst precursor by blowing air through the stack or heating the stack at 100° C. or higher.

7. Method according to claim 1, wherein the catalyst precursor is selected from the group of $(La_{1-x}Sr_x)MnO_{3-\delta}$, $(Ln_{1-x}Sr_x)MnO_{3-\delta}$, $(Ln_{1-x}Sr_x)Fe_{1-y}Co_yO_{3\delta}$, $(Y_{1-x}Ca_x)Fe_{1-y}Co_yO_{3-\delta}$, $(Gd_{1-x}Sr_x)Fe_{1-y}Co_yO_{3-\delta}$, $(Gd_{1-x}Ca_x)Fe_{1-y}Co_yO_{3-\delta}$, $(Y,Ca)Fe_{1-y}Co_yO_{3-\delta}$, ceria, doped ceria, zirconia, doped zirconia, $La(Ni,Fe)O_3$, $La(Ni,Co)O_3$, $La_2NiO_4$, $Ln_{1-x}AE_{2x}TmO_4$, where TM is a transition metal, Ln is a lanthanide element and AE is an alkali earth element, $Pr_2O_3$; and mixtures thereof, and where $0 \leq x \leq 1$; $0 \leq y \leq 1$; and $0 \leq \delta \leq 0.3$.

8. A method for reactivating a solid oxide cell stack comprising an internal manifold, an external manifold or a combination of both, the method comprising the steps of:
assembling the solid oxide cell stack by arranging a plurality of single solid oxide cells into a stack, each of the plurality of single solid oxide cells containing electrode layers separated by an electrolyte layer;
initiating the solid oxide cell stack by undergoing anode reduction; and
subsequently, reactivating the solid oxide cell stack by
(a) impregnating a catalyst precursor into only a cathode of the solid oxide cell stack by introducing a solution of the catalyst precursor via the internal or external manifold, and
(b) subsequently drying the solution of the catalyst precursor,
wherein steps (a) and (b) are conducted at least once after the solid oxide cell stack has been assembled and initiated so that the electrode layers become catalytically active.

9. Method according to claim 8, wherein the cathode in step (a) is already active.

10. Method according to claim 8, in which catalytic active material is provided in at least one of the electrode layers of each of the plurality of single solid oxide cells via a ceramic processing technique or by an impregnation with the catalyst precursor before the solid oxide cell stack has been initiated.

11. Method according to claim 8, comprising impregnating the catalyst precursor in step (a) by means of pouring or pumping the solution of the catalyst precursor through the manifolds of the stack.

12. Method according to claim 8, comprising drying the solution of the catalyst precursor in step (b) by blowing air through the stack or heating the stack at 200° C. or higher.

13. Method according to claim 1, wherein the catalyst precursor is selected from MgO, CaO, $Al_2O_3$/MgO, $CaZrO_3$, $SrZrO_3$, $BaZrO_3$, CaO, SrO, BaO or the carbonates $SrCO_3$, $CaCO_3$ or $BaCO_3$.

14. Method according to claim 13, wherein the catalyst precursor is provided as an aqueous solution of ceria.

15. Method according to claim 14, wherein the aqueous solution contains a solvent and a surfactant.

\* \* \* \* \*